United States Patent
Kobayashi et al.

(10) Patent No.: US 12,499,296 B2
(45) Date of Patent: Dec. 16, 2025

(54) SIMULATION DEVICE, SIMULATION METHOD, AND COMPUTER READABLE MEDIUM

(71) Applicant: MITSUBISHI ELECTRIC CORPORATION, Tokyo (JP)

(72) Inventors: Taiki Kobayashi, Tokyo (JP); Tomooki Ukiana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 856 days.

(21) Appl. No.: 17/840,155

(22) Filed: Jun. 14, 2022

(65) Prior Publication Data

US 2022/0309212 A1    Sep. 29, 2022

Related U.S. Application Data

(63) Continuation of application No. PCT/JP2020/003923, filed on Feb. 3, 2020.

(51) Int. Cl.
G06F 30/20    (2020.01)
G06F 119/06   (2020.01)

(52) U.S. Cl.
CPC .......... *G06F 30/20* (2020.01); *G06F 2119/06* (2020.01)

(58) Field of Classification Search
CPC ...... G06F 30/20; G06F 2119/06; G06F 30/13; G06Q 50/06; G06Q 10/04; G06Q 50/10
See application file for complete search history.

(56) References Cited

U.S. PATENT DOCUMENTS

| | | |
|---|---|---|
| 5,978,830 A | 11/1999 | Nakaya et al. |
| 2010/0305917 A1 | 12/2010 | Takahashi et al. |
| 2012/0259469 A1 | 10/2012 | Ward et al. |

(Continued)

FOREIGN PATENT DOCUMENTS

| | | |
|---|---|---|
| JP | 6-261453 A | 9/1994 |
| JP | 10-240549 A | 9/1998 |

(Continued)

OTHER PUBLICATIONS

International Search Report (PCT/ISA/210) issued in PCT/JP2020/003923 mailed on Apr. 21, 2020.

(Continued)

*Primary Examiner* — Chuen-Meei Gan
(74) *Attorney, Agent, or Firm* — Birch, Stewart, Kolasch & Birch, LLP

(57) ABSTRACT

An acquisition unit (21) acquires a simulation period indicating an object period for which simulations of amounts of energy consumption in a building are to be done, a parallel number indicating the number of the simulations that are to be performed in parallel, and a holiday condition indicating nonoperating days of an air conditioning system installed in the building. A planning unit (22) splits the simulation period into the parallel number to generate split periods. The planning unit (22) splits the simulation period into the parallel number so that starting days of the split periods other than an initial split period may be the nonoperating days indicated by the holiday condition. A simulation unit (23) does the simulations of the amounts of energy consumption in the building in parallel, for the split periods.

19 Claims, 12 Drawing Sheets

(56) References Cited

U.S. PATENT DOCUMENTS

| | | | |
|---|---|---|---|
| 2013/0179142 A1* | 7/2013 | Kim | G06F 30/33 |
| | | | 703/14 |
| 2014/0058572 A1* | 2/2014 | Stein | G06Q 50/06 |
| | | | 700/291 |
| 2015/0178421 A1* | 6/2015 | Borrelli | G06F 30/13 |
| | | | 703/7 |
| 2016/0327295 A1 | 11/2016 | Ward et al. | |
| 2020/0034768 A1* | 1/2020 | Yamaguchi | H02J 3/004 |

FOREIGN PATENT DOCUMENTS

| | | | |
|---|---|---|---|
| JP | 2005-149078 A | 6/2005 | |
| JP | 2010-44738 A | 2/2010 | |
| JP | 2012-103811 A | 5/2012 | |
| JP | 2013-514510 A | 4/2013 | |
| JP | 2015-215772 A | 12/2015 | |
| JP | 2017-134460 A | 8/2017 | |
| JP | 2018-23227 A | 2/2018 | |
| JP | 2018-71891 A | 5/2018 | |
| WO | WO 2009/057189 A1 | 5/2009 | |

OTHER PUBLICATIONS

Written Opinion (PCT/ISA/237) issued in PCT/JP2020/003923 mailed on Apr. 21, 2020.

* cited by examiner

SIMULATION DEVICE, SIMULATION METHOD, AND COMPUTER READABLE MEDIUM

CROSS REFERENCE TO RELATED APPLICATIONS

This application is a Continuation of PCT International Application No. PCT/JP2020/003923, filed on Feb. 3, 2020, which is hereby expressly incorporated by reference into the present application.

TECHNICAL FIELD

The present disclosure relates to a technique of simulating an amount of energy consumption in a building.

BACKGROUND ART

It has been conceived that an amount of energy consumption in a building is simulated, before construction of the building, to be used for a design of the building. The simulation of the amount of energy consumption in a building involves a large amount of calculation and may take much time for the calculation. Accordingly, it can be conceived that a simulation period which is an object period of the simulation is split into a plurality of split periods such that simulations are done in parallel for the respective split periods.

An amount of energy consumption by an air conditioning system installed in a building, however, fluctuates depending on quantities of state concerning thermal environments inside and outside the building. The quantities of state concerning thermal environments refer to temperatures, humidities, and the like. The quantities of state concerning thermal environments are determined by conditions such as the quantities of state of past and operating status of the air conditioning system at time of the simulation. In case where the simulations are done in parallel for the respective split periods, therefore, errors may occur in the simulations unless the quantities of state at starting points of the split periods are adequately set up.

Patent Literature 1 discloses use of data, measured in the object building of the simulations, as initial values.

CITATION LIST

Patent Literature

Patent Literature 1: JP 2012-103811

SUMMARY OF INVENTION

Technical Problem

In case where amounts of energy consumption in a building are simulated before construction of the building, data measured in the object building cannot be used as initial values as disclosed in Patent Literature 1.

The present disclosure aims at decreasing the errors in the simulations while doing the simulations in parallel for the respective split periods.

Solution to Problem

A simulation device according to the present disclosure includes
an acquisition unit to acquire a simulation period indicating an object period for which simulations of amounts of energy consumption in a building are to be done, a parallel number indicating the number of the simulations that are to be performed in parallel, and a holiday condition indicating nonoperating days of an air conditioning system installed in the building;
a planning unit to split the simulation period, acquired by the acquisition unit, into the parallel number so as to generate split periods, the planning unit splitting the simulation period into the parallel number so that starting days of the split periods other than an initial split period in the simulation period are the nonoperating days indicated by the holiday condition; and
a simulation unit to do the simulations of the amounts of energy consumption in the building in parallel, for the split periods generated by splitting by the planning unit.

Advantageous Effects of Invention

In the present disclosure, the simulation period is split into the parallel number of the split periods so that the starting days of the split periods may be nonoperating days of the air conditioning system.

As a matter of course, the air conditioning system is not operated during the nonoperating days. Quantities of state concerning thermal environment inside the building, however, are changed over periods of the nonoperating days, under influence of temperature difference between inside and outside of the building and drafts. During the nonoperating days, therefore, the quantities of state concerning the thermal environment inside the building asymptotically approach a steady state of the nonoperating days and thus influence of initialization errors due to splitting asymptotically decreases. As a result, even if the simulations are done in parallel for the respective split periods based on initial values for which operating status of the air conditioning system are not considered, the errors in the simulations can be decreased.

DESCRIPTION OF EMBODIMENTS

Embodiment 1

*Description of Configuration*

Figure 1:
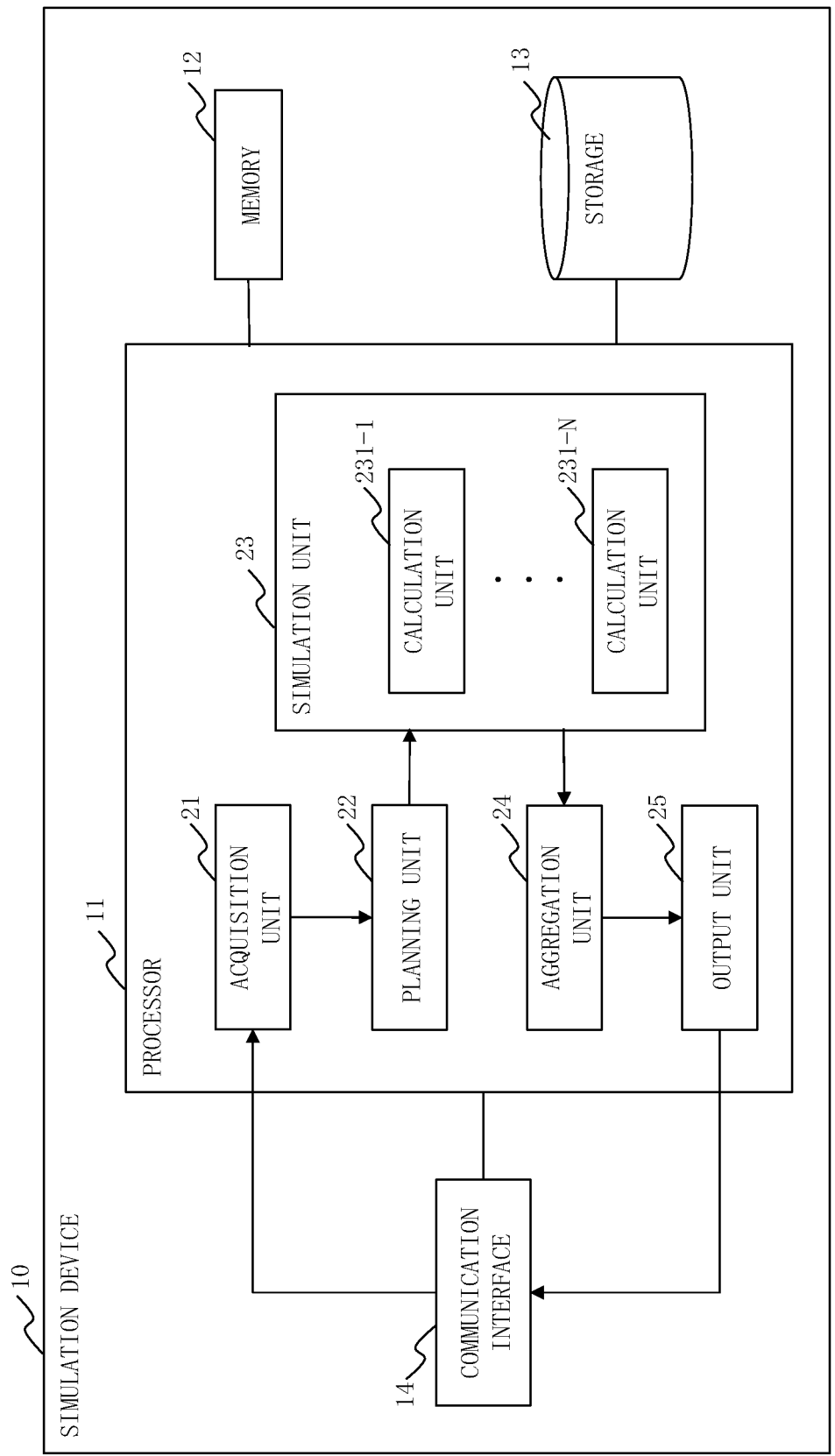
FIG. 1 is a configuration diagram of a simulation device 10 according to Embodiment 1.

With reference to FIG. 1, a configuration of a simulation device 10 according to Embodiment 1 will be described.

The simulation device 10 is a computer.

The simulation device 10 includes a processor 11, a memory 12, storage 13, and a communication interface 14, as hardware. The processor 11 is connected to other hardware through signal lines in order to control the other hardware.

The processor 11 is an IC (Integrated Circuit) to carry out processing. Specific examples of the processor 11 are CPU (Central Processing Unit), DSP (Digital Signal Processor), and GPU (Graphics Processing Unit).

The memory 12 is a storage device to temporarily store data. Specific examples of the memory 12 are SRAM (Static Random Access Memory) and DRAM (Dynamic Random Access Memory).

The storage 13 is a storage device to save data. A specific example of the storage 13 is HDD (Hard Disk Drive). Alternatively, the storage 13 may be a portable recording medium such as SD (registered trademark, Secure Digital) memory card, CF (CompactFlash, registered trademark), NAND flash, flexible disk, optical disk, compact disc, Blu-ray (registered trademark) disk, or DVD (Digital Versatile Disk).

The communication interface 14 is an interface for communication with external devices. Specific examples of the communication interface 14 are ports of Ethernet (registered trademark), USB (Universal Serial Bus), and HDMI (registered trademark, High-Definition Multimedia Interface).

The simulation device 10 includes an acquisition unit 21, a planning unit 22, a simulation unit 23, an aggregation unit 24, and an output unit 25, as functional components. The simulation unit 23 includes a plurality of calculation units 231. Incidentally, the simulation unit 23 includes the calculation units 231 whose number is equal to or greater than a parallel number that will be described later. Functions of the functional components of the simulation device 10 are implemented by software.

A program that implements the functions of the functional components of the simulation device 10 is stored in the storage 13. This program is read into the memory 12 by the processor 11 and is executed by the processor 11. Thus the functions of the functional components of the simulation device 10 are implemented.

In FIG. 1, only one processor 11 is illustrated. A plurality of processors 11, however, may be provided and the plurality of processors 11 may cooperate to execute the program that implements the functions.

*Description of Operation*

With reference to FIGS. 2 to 5, operation of the simulation device 10 according to Embodiment 1 will be described.

An operation procedure for the simulation device 10 according to Embodiment 1 is equivalent to a simulation method according to Embodiment 1. Additionally, a program that implements the operation of the simulation device 10 according to Embodiment 1 is equivalent to a simulation program according to Embodiment 1.

Figure 2:
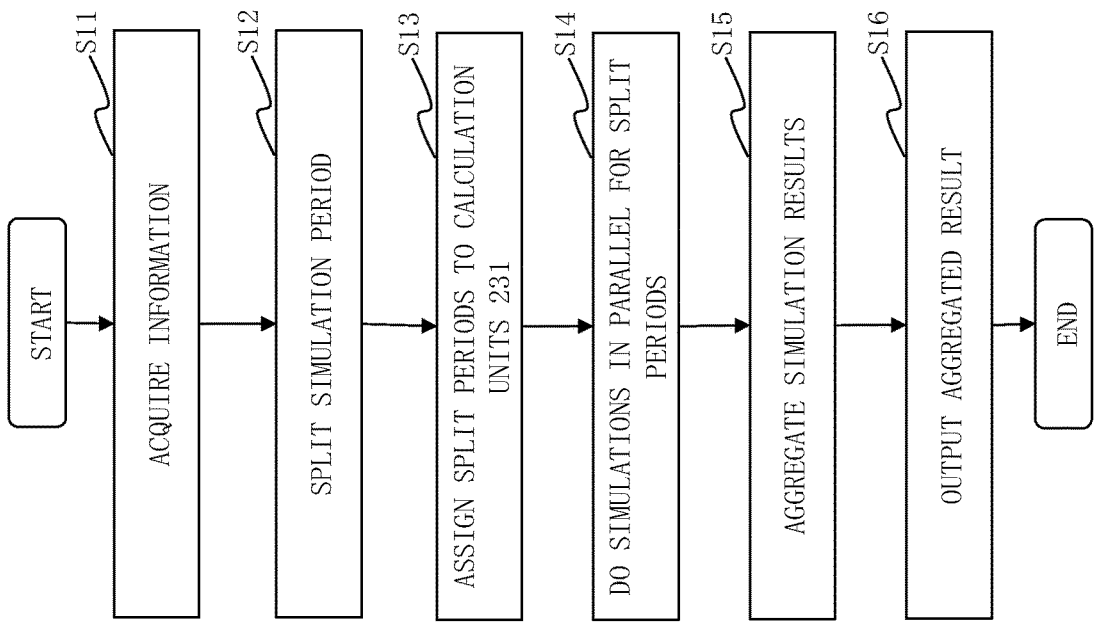
FIG. 2 is a flowchart of general processing by the simulation device 10 according to Embodiment 1.

With reference to FIG. 2, general processing by the simulation device 10 according to Embodiment 1 will be described.

(Step S11: Acquisition Process)

The acquisition unit 21 acquires a simulation period, a parallel number, a holiday condition, and simulation conditions.

Specifically, a user of the simulation device 10 operates an input device to input the simulation period, the parallel number, the holiday condition, and the simulation conditions. The acquisition unit 21 acquires the simulation period, the parallel number, the holiday condition, and the simulation conditions that have been inputted.

The simulation period indicates an object period for which a simulation of an amount of energy consumption in a building is to be done. The parallel number indicates the number of simulations that are to be performed in parallel. The holiday condition indicates nonoperating days of an air conditioning system installed in the building. The simulation conditions indicate conditions concerning the building required for the simulation of the amount of energy consumption. Specifically, the simulation conditions include (1) data on the object building for the simulation, (2) data on facilities provided for the building, (3) weather conditions to be used for thermal load calculation, (4) a condition concerning existence of persons in rooms, (5) a heat generating condition concerning equipment, and (6) a controlling condition for the facilities. A specific example of the data on the building is data specifying area, number of stories, number of rooms, structure, materials of walls, and the like of the building. A specific example of the data on the facilities is data specifying types of the facilities, rated capacity, rated power consumption, capacity correction coefficient based on an operating condition, installation positions of the facilities, and the like. As for the rated capacity, the rated power consumption, and the capacity correction coefficient based on the operating condition, incidentally, a model number made to correspond to those values may be acquired instead of those values and those values may be acquired based on correspondence between model numbers and those values that has been stored separately.

(Step S12: Planning Process)

The planning unit 22 splits the simulation period, acquired in step S11, into the parallel number to generate the parallel number of the split periods. At this time, the planning unit 22 splits the simulation period into the parallel number so that starting days of the split periods other than at least the initial split period in the simulation period may be nonoperating days indicated by the holiday condition. Additionally, the planning unit 22 splits the simulation period into the parallel number so that the number of days of each split period may approximate a reference number of days resulting from division of the number of days of the simulation period by the parallel number with roundup of digits after the decimal point.

Then the planning unit 22 sets each split period as an object split period and generates subconditions providing for the simulation conditions corresponding to the object split period. Among the simulation conditions, the conditions of (3) to (6) change depending on the period. As for the conditions of (3) to (6), accordingly, the planning unit 22 extracts the conditions corresponding to the object split period and sets the conditions as the subconditions concerning the object split period.

Details of a process of splitting the simulation period into the parallel number will be described later.

(Step S13: Assignment Process)

The planning unit 22 assigns the split periods, generated in step S12, to the different calculation units 231 included in the simulation unit 23.

(Step S14: Simulation Process)

The simulation unit 23 does the simulations of the amounts of energy consumption in the building, in parallel, for the split periods generated by splitting in step S12.

Figure 3:
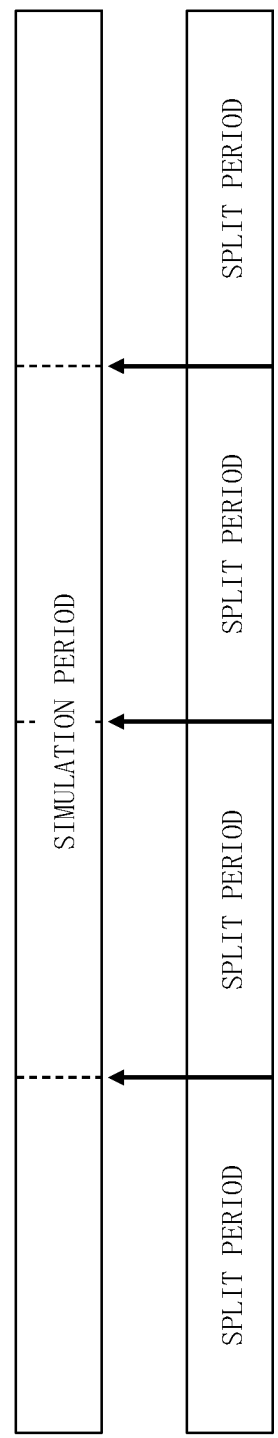
FIG. 3 is an explanatory diagram for a simulation process according to Embodiment 1.

Specifically, the calculation units 231 to which the split periods have been assigned use the subconditions, concerning the assigned split periods, as input and do the simulations of the amounts of energy consumption in the building for the assigned split periods, respectively. As illustrated in FIG. 3, for instance, it is assumed that the simulation period is split into four split periods. In this case, four calculation units 231 do the simulations for the split periods in parallel. Therefore, the simulations can be done in about a quarter of the time one calculation unit 231 takes to do the simulations for the simulation period.

(Step S15: Aggregation Process)

The aggregation unit 24 aggregates results of the simulations by the calculation units 231 in step S14 and generates a result for the simulation period.

For instance, it is assumed that the results of the simulations by the calculation units 231 each represent a total value of the amounts of energy consumption in the split period. In this case, the aggregation unit 24 sums up the total values obtained by the calculation units 231 and thus generates a result indicating the amount of energy consumption in the simulation period. It is assumed that the results of the simulations by the calculation units 231 represent the amounts of energy consumption in respective days in the split periods. In this case, the aggregation unit 24 integrates the amounts of energy consumption in the respective days, obtained by the calculation units 231, and thus generates results indicating the amounts of energy consumption in the respective days in the simulation period.

(Step S16: Output Process)

The output unit 25 outputs the result concerning the simulation period, generated in step S15, onto a terminal or the like of the user of the simulation device 10 through the communication interface 14.

Figure 4:
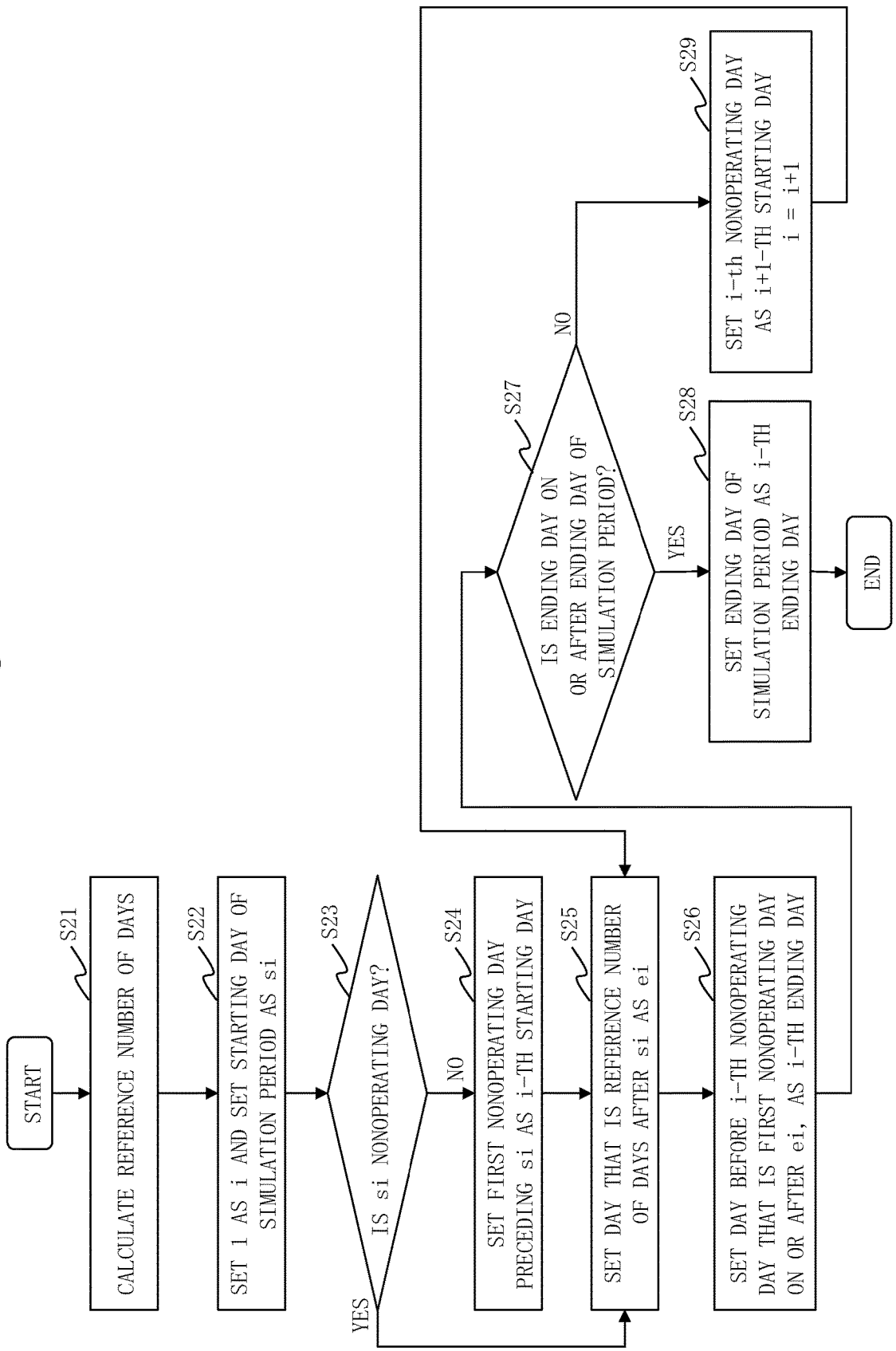
FIG. 4 is a flowchart of a process of splitting a simulation period into a parallel number, according to Embodiment 1.

With reference to FIG. 4, the process of splitting the simulation period into the parallel number, according to Embodiment 1, will be described.

In step S21, the planning unit 22 calculates the number of days, resulting from the division of the number of days of the simulation period by the parallel number with the roundup of digits after the decimal point, as the reference number of days. In step S22, the planning unit 22 sets 1 as a variable i. In addition, the planning unit 22 sets a starting day of the simulation period as a variable si.

In step S23, the planning unit 22 determines whether the day set as the variable si is a nonoperating day or not. If the day set as the variable si is an operating day, the planning unit 22 advances the processing to step S24. On the other hand, if the day set as the variable si is a nonoperating day, the planning unit 22 advances the processing to step S25.

In step S24, the planning unit 22 sets a first nonoperating day preceding the day set as the variable si, as a starting day of i-th split period. In addition, the planning unit 22 sets the first nonoperating day before the day set as the variable si, as the variable si.

In step S25, the planning unit 22 sets a day that is the reference number of days after the variable si, as a variable ei. In case where the variable i is 1, however, the planning unit 22 sets a day that is the reference number of days after the starting day of the simulation period as the variable ei. In step S26, the planning unit 22 sets a day before i-th nonoperating day that is a first nonoperating day on or after the variable ei, as an ending day of the i-th split period.

In step S27, the planning unit 22 determines whether the ending day of the i-th split period is a day on or after the ending day of the simulation period or not. If the ending day of the i-th split period is a day on or after the ending day, the planning unit 22 advances the processing to step S28. On the other hand, if the ending day of the i-th split period is a day preceding the ending day, the planning unit 22 advances the processing to step S29.

In step S28, the planning unit 22 sets the ending day of the simulation period as the ending day of the i-th split period. Then the processing is ended. On the other hand, in step S29, the planning unit 22 sets the i-th nonoperating day as a starting day of i+1-th split period. In addition, the planning unit 22 sets the i-th nonoperating day as the variable si. Then 1 is added to the variable i and the processing is thereafter returned to step S25.

Figure 5:
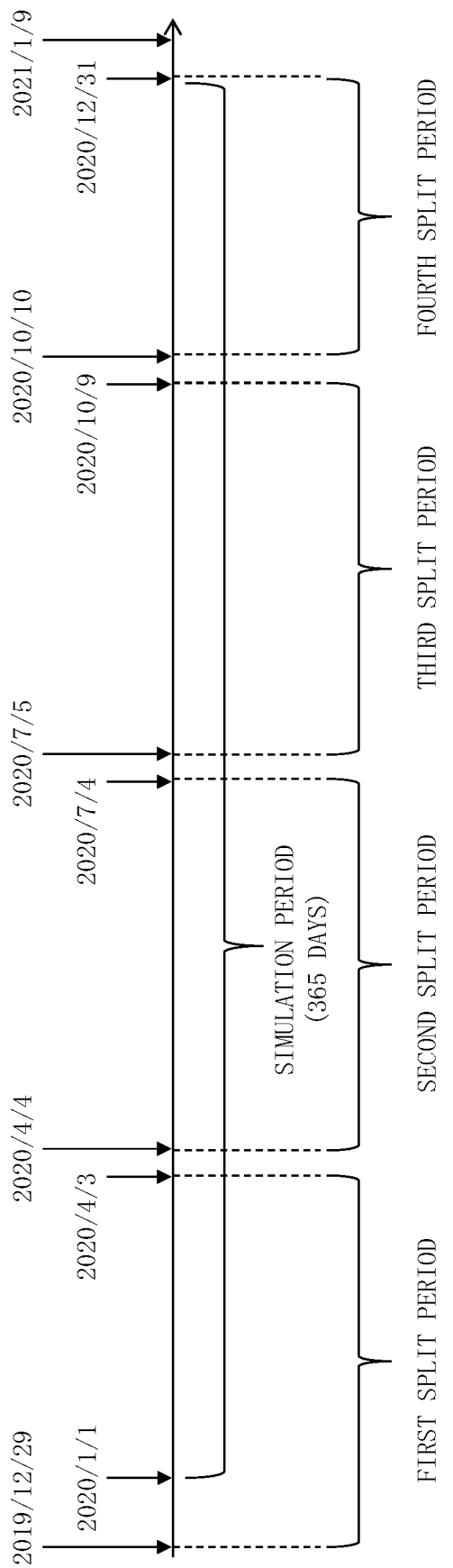
FIG. 5 is an explanatory diagram for a specific example of the process of splitting the simulation period into the parallel number, according to Embodiment 1.

With reference to FIG. 5, a specific example will be described.

Herein, it is assumed that the simulation period is 365 days from Jan. 1, 2020 to Dec. 31, 2020, that the parallel number is 4, and that the nonoperating days are Saturdays and Sundays.

In step S21, Ceiling (365 days/4)=92 days is calculated as the reference number of days because the simulation period is 365 days and because the parallel number is 4. Herein, Ceiling function is a function of roundup of digits after the decimal point. In step S22, 1 is set as the variable i and Jan. 1, 2020 is set as the variable si.

In step S23, the processing is advanced to step S24 because Jan. 1, 2020 set as the variable si is Wednesday and an operating day. In step S24, Dec. 29, 2019 that is the first nonoperating day preceding Jan. 1, 2020 is set as the starting day of the first split period. In addition, Dec. 29, 2019 is set as the variable si.

In step S25, the variable i is 1 and thus Apr. 2, 2020 that is 92 days after Jan. 1, 2020 being the starting day of the simulation period is set as the variable ei. In step S26, Apr. 3, 2020 that is the day before Apr. 4, 2020 being the first nonoperating day on or after Apr. 2, 2020 is set as the ending day of the first split period.

In step S27, the processing is advanced to step S29 because Apr. 3, 2020 is not a day on or after the ending day of the simulation period. In step S29, Apr. 4, 2020 is set as the starting day of the second split period. In addition, Apr. 4, 2020 is set as the variable si. Then the variable i is changed into 2 and the processing is thereafter returned to step S25.

In step S25, Jul. 5, 2020 that is 92 days after Apr. 4, 2020 set as the variable si is set as the variable ei. In step S26, Jul. 4, 2020 that is the day before Jul. 5, 2020 being the first nonoperating day on or after Jul. 5, 2020 is set as the ending day of the second split period.

In step S27, the processing is advanced to step S29 because Jul. 4, 2020 is not a day on or after the ending day of the simulation period. In step S29, Jul. 5, 2020 is set as the starting day of the third split period. In addition, Jul. 5, 2020 is set as the variable si. Then the variable i is changed into 3 and the processing is thereafter returned to step S25.

In step S25, Oct. 5, 2020 that is 92 days after Jul. 5, 2020 set as the variable si is set as the variable ei. In step S26, Oct. 9, 2020 that is the day before Oct. 10, 2020 being the first nonoperating day on or after Oct. 5, 2020 is set as the ending day of the third split period.

In step S27, the processing is advanced to step S29 because Oct. 9, 2020 is not a day on or after the ending day of the simulation period. In step S29, Oct. 10, 2020 is set as the starting day of the fourth split period. In addition, Oct. 10, 2020 is set as the variable si. Then the variable i is changed into 4 and the processing is thereafter returned to step S25.

In step S25, Jan. 10, 2021 that is 92 days after Oct. 10, 2020 set as the variable si is set as the variable ei. In step S26, Jan. 9, 2021 that is the day before Jan. 10, 2021 being the first nonoperating day on or after Jan. 10, 2021 is set as the ending day of the fourth split period.

In step S27, the processing is advanced to step S28 because Jan. 9, 2021 is a day on or after the ending day of the simulation period. In step S28, Dec. 31, 2020 that is the ending day of the simulation period is set as the ending day of the fourth split period. Then the processing is ended.

*Effects of Embodiment 1*

As described above, the simulation device 10 according to Embodiment 1 splits the simulation period into the parallel number of the split periods so that the starting days of the split periods may be nonoperating days of the air conditioning system. During the nonoperating days, the quantities of state concerning the thermal environment inside the building approach values under no influence of the operating status of the air conditioning system before the nonoperating days. As a result, even if the simulations are done in parallel for the respective split periods based on initial values for which the operating status of the air conditioning system is not considered, errors in the simulations can be decreased.

*Other Configurations*

<Modification 1>

In Embodiment 1, if the starting day of the simulation period is not a nonoperating day, a day preceding the starting day of the simulation period is set as the starting day of the first split period. Setting of a nonoperating day as the starting day of the first split period may enable performance of the simulations with small errors. The simulations, however, take time all the more for elongation of the period for which the simulations are done.

Therefore, the starting day of the simulation period may be set as the starting day of the first split period, irrespective of whether the starting day of the simulation period is a nonoperating day or not. Thus there is a possibility that an error in the simulation for the first split period may be increased, whereas the elongation of the time taken by the simulation can be prevented.

<Modification 2>

In Embodiment 1, the nonoperating day that is the reference number of days or more after the starting day of a split period becomes the starting day of the next split period. Therefore, the split periods other than the last split period may become longer than the reference number of days. As a result, only the last split period may be substantially shorter than the reference number of days.

Accordingly, the process of splitting the simulation period into the parallel number may be altered as follows.

Figure 6:
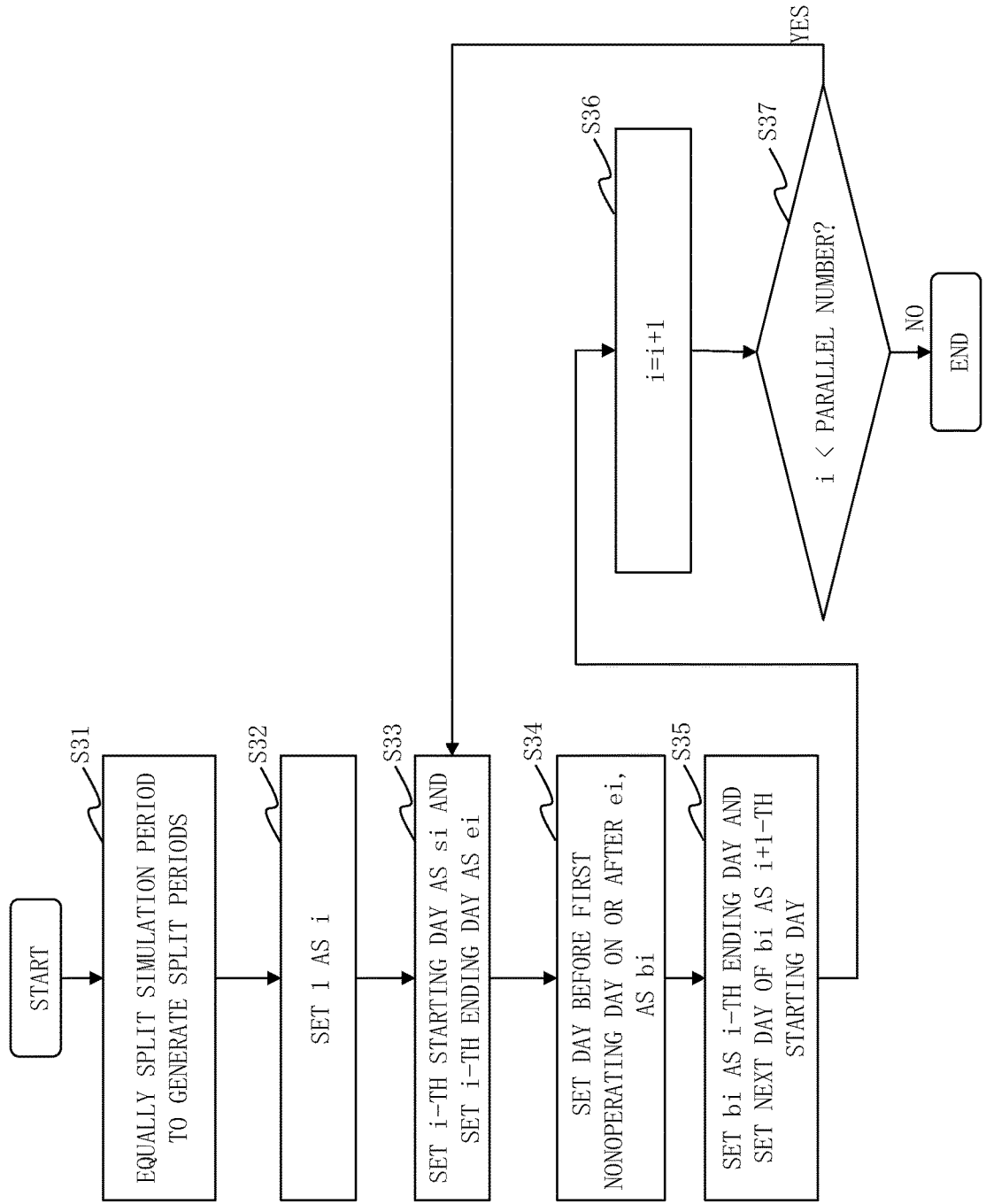
FIG. 6 is a flowchart of a process of splitting a simulation period into a parallel number, according to Modification 2.

With reference to FIG. 6, the process of splitting the simulation period into the parallel number, according to Modification 2, will be described.

In step S31, the planning unit 22 splits the simulation period into the parallel number so as to attain equal numbers of days and generates the parallel number of the split periods. In case where the number of days of the simulation period is indivisible by the parallel number, lengths of the periods may differ by one day among the split periods. In step S32, the planning unit 22 sets 1 as the variable i.

In step S33, the planning unit 22 sets the starting day of the i-th split period as the variable si and sets the ending day of the i-th split period as the variable ei. In step S34, the planning unit 22 sets the day before the first nonoperating day on or after the day set as the variable ei, as a variable bi. In step S35, the planning unit 22 resets the day set as the variable bi, as the ending day of the i-th split period. In addition, the planning unit 22 resets the next day of the day set as the variable bi, as the starting day of the i+1-th split period.

In step S36, the planning unit 22 adds 1 to the variable i. In step S37, the planning unit 22 determines whether the variable i is smaller than the parallel number or not. If the variable i is smaller than the parallel number, the planning unit 22 returns the processing to step S33. On the other hand, if the variable i is equal to or greater than the parallel number, the planning unit 22 ends the processing.

Thus a possibility that the lengths of the split periods approximate the reference number of days is increased.

<Modification 3>

In step S24 in Embodiment 1, the first nonoperating day preceding the day set as the variable si is set as the starting day of the first split period. In the specific example illustrated in FIG. 5, accordingly, Dec. 29, 2019, which is Sunday, is set as the starting day of the first split period.

In step S29 in Embodiment 1, the first nonoperating day on or after the variable ei is set as the starting day of the i+1-th split period. In case where the first nonoperating day on or after the variable ei is Sunday, accordingly, Sunday is set as the starting day of the split period. In the specific example illustrated in FIG. 5 in which July 5, Sunday, 2020 is set as the variable ei, for instance, Jul. 5, 2020 is set as the starting day of the third split period.

Herein, the simulation device 10 according to Embodiment 1 sets the starting days of the split periods on nonoperating days of the air conditioning system. Thus the simulation device 10 ensures that the quantities of state concerning the thermal environments inside the building approach, during the nonoperating days, values under no influence of the operating status of the air conditioning system before the nonoperating days.

The longer a period from the starting day of the split period to operation of the air conditioning system is, the more prone the quantities of state are to approach the values under no influence of the operating status of the air conditioning system before the operating days. In case of consecutive holidays in which nonoperating days continue, therefore, it is preferable that a first day of the consecutive holidays is set as the starting day of the split period.

In case where each split period is set as the object split period and where the starting day of the object split period is within consecutive holidays in which nonoperating days continue, accordingly, the planning unit 22 may set the starting day of the object split period on the first day of the consecutive holidays. In case where the object split period is not the first split period, in this case, the planning unit 22 sets the ending day of the split period before the object split period on the day before the first day of the consecutive holidays.

<Modification 4>

Embodiment 1 presupposes that heat exchange between room interior of the building and outdoors is made during nonoperating days and that the quantities of state concerning the thermal environment inside the building approach the values under no influence of the operating status of the air conditioning system before the nonoperating days. In case where the heat exchange between the room interior of the building and the outdoors is small in amount, however, this presupposition collapses. As specific examples, the case where the heat exchange between the room interior of the building and the outdoors is small in amount refers to a case where a ventilation frequency on nonoperating days is low, a case where air leak from the room interior is small in amount, and the like.

Therefore, the simulation period may be split into the parallel number of the split periods so that the starting days of the split periods may be nonoperating days of the air conditioning system, in case where the amount of the heat exchange between the room interior of the building and the outdoors exceeds a reference value.

Figure 7:
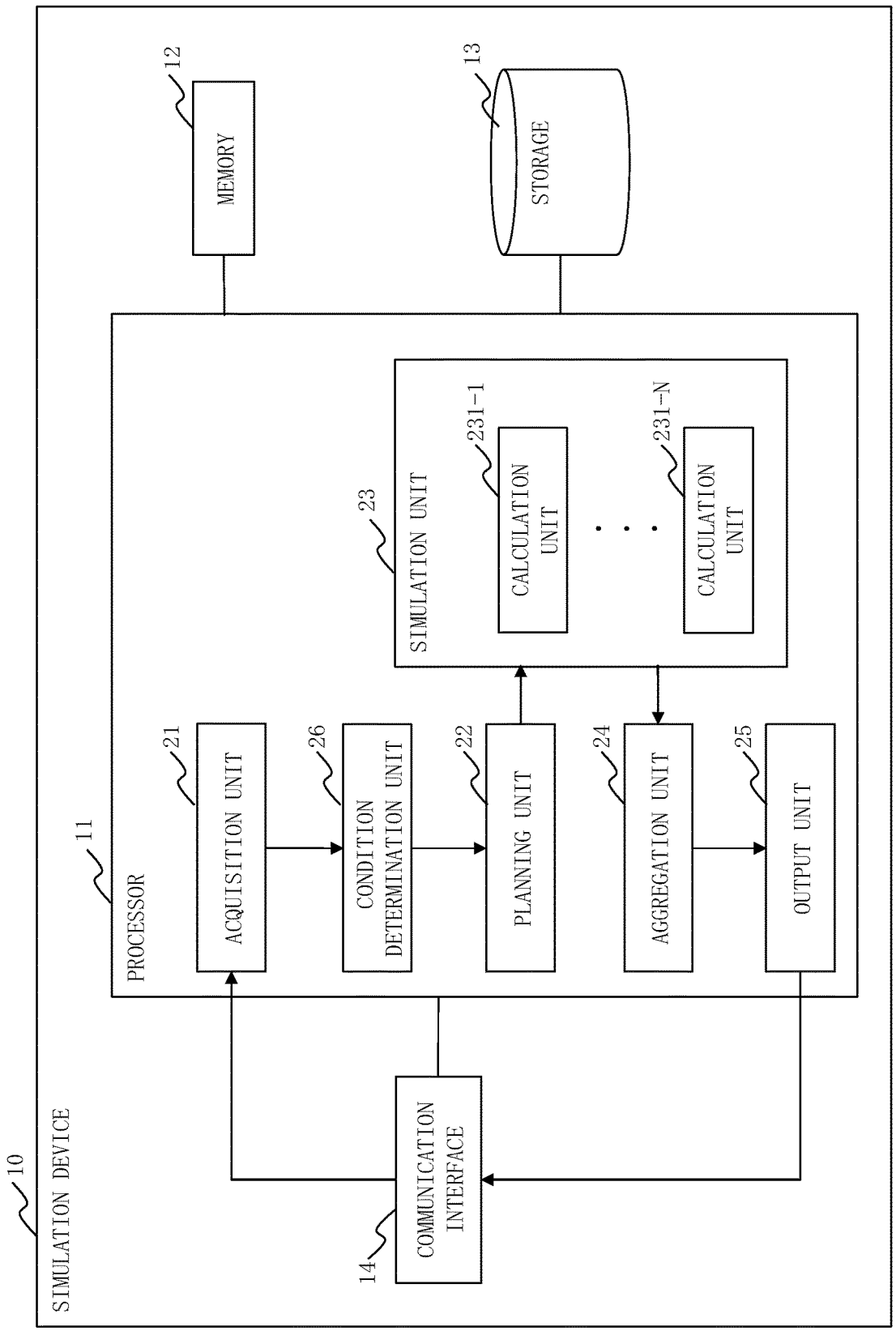
FIG. 7 is a configuration diagram of the simulation device 10 according to Modification 4.

With reference to FIG. 7, a configuration of the simulation device 10 according to Modification 4 will be described.

The simulation device 10 differs from the simulation device 10 illustrated in FIG. 1 in that a condition determination unit 26 is included as a functional component.

Figure 8:
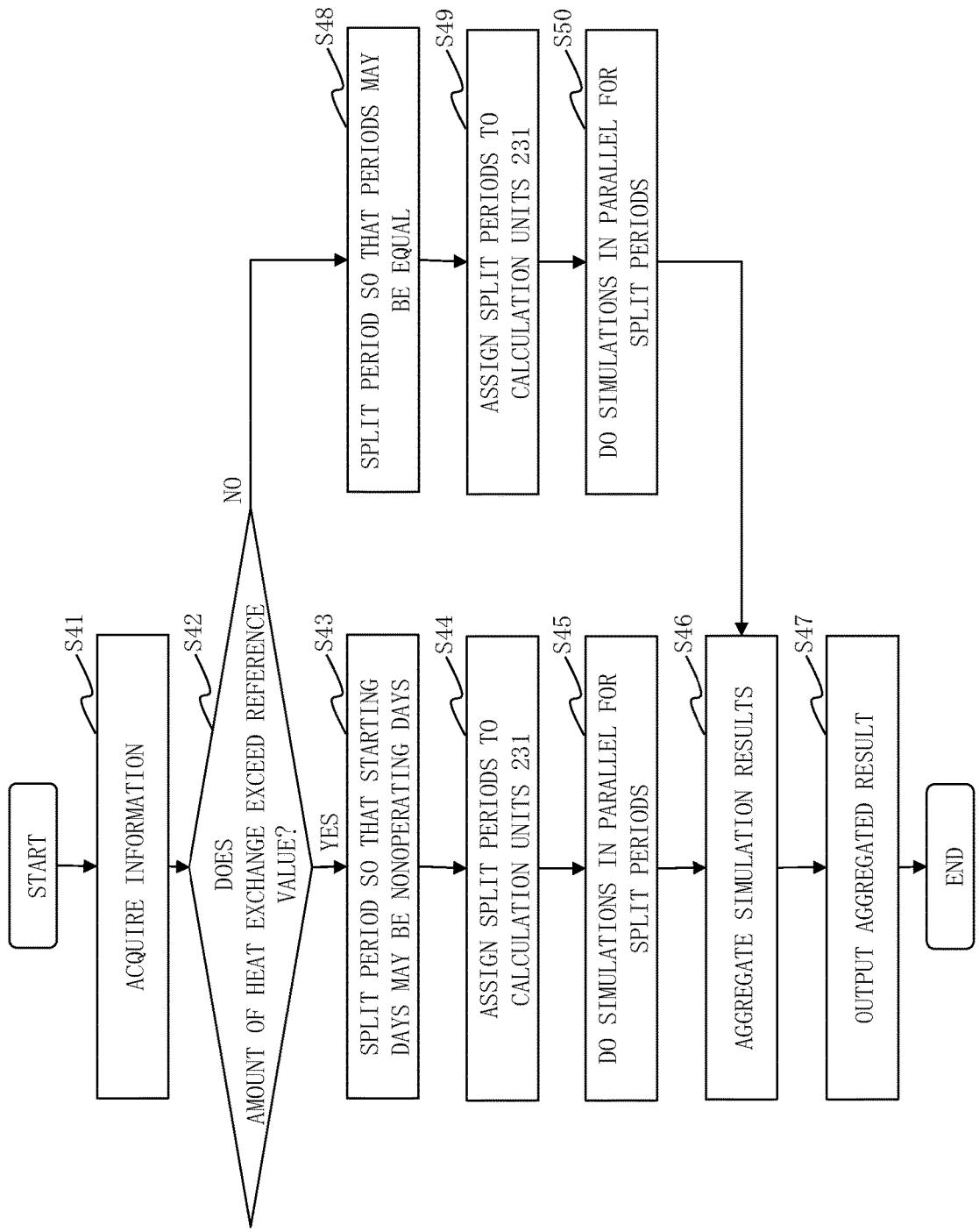
FIG. 8 is a flowchart of general processing by the simulation device 10 according to Modification 4.

With reference to FIG. 8, general processing by the simulation device 10 according to Modification 4 will be described.

A process of step S41 is the same as the process of step S11 in FIG. 2. As a simulation condition, however, data indicating the amount of the heat exchange between the room interior of a building and the outdoors is also included. In addition, processes of step S43 to step S47 are the same as the processes of step S12 to step S16 in FIG. 2.

(Step S42: Condition Determination Process)

The condition determination unit 26 refers to simulation conditions acquired in step S41 and determines whether the amount of the heat exchange between the room interior of the building and the outdoors exceeds the reference value or not.

If it is determined that the amount of the heat exchange exceeds the reference value, the condition determination unit 26 advances the processing to step S43. As a result, as with Embodiment 1, the planning unit 22 splits the simulation period into the parallel number so that the starting days of the split periods may be nonoperating days.

On the other hand, if it is determined that the amount of the heat exchange does not exceed the reference value, the condition determination unit 26 advances the processing to step S48.

(Step S48: Second Planning Process)

The planning unit 22 equally splits the simulation period into the parallel number to generate the parallel number of the split periods. Additionally, the planning unit 22 sets each split period as an object split period and sets a period, preceding the object split period, as a runway period for the object split period.

Then the planning unit 22 sets each split period as the object split period and generates subconditions providing for the simulation conditions corresponding to the object split period, as with step S12 in FIG. 2.

(Step S49: Second Assignment Process)

The planning unit 22 assigns the split periods, generated in step S48, to the different calculation units 231 included in the simulation unit 23.

(Step S50: Second Simulation Process)

The simulation unit 23 does simulations of amounts of energy consumption in a building, in parallel, for the split periods generated by splitting in step S48.

Specifically, the calculation units 231 to which the split periods have been assigned use the subconditions, concerning the assigned split periods, as input and do the simulations of the amounts of energy consumption in the building for the assigned split periods, respectively. On this occasion, the calculation units 231 do the simulations for the split periods by using quantities of state concerning thermal environment for ending days of the runway periods, acquired from the simulations for the runway periods for the split periods, as initial values.

<Modification 5>

In Embodiment 1, the functional components are implemented by software. In Modification 5, however, functional components may be implemented by hardware. As for this Modification 5, differences from Embodiment 1 will be described.

Figure 9:
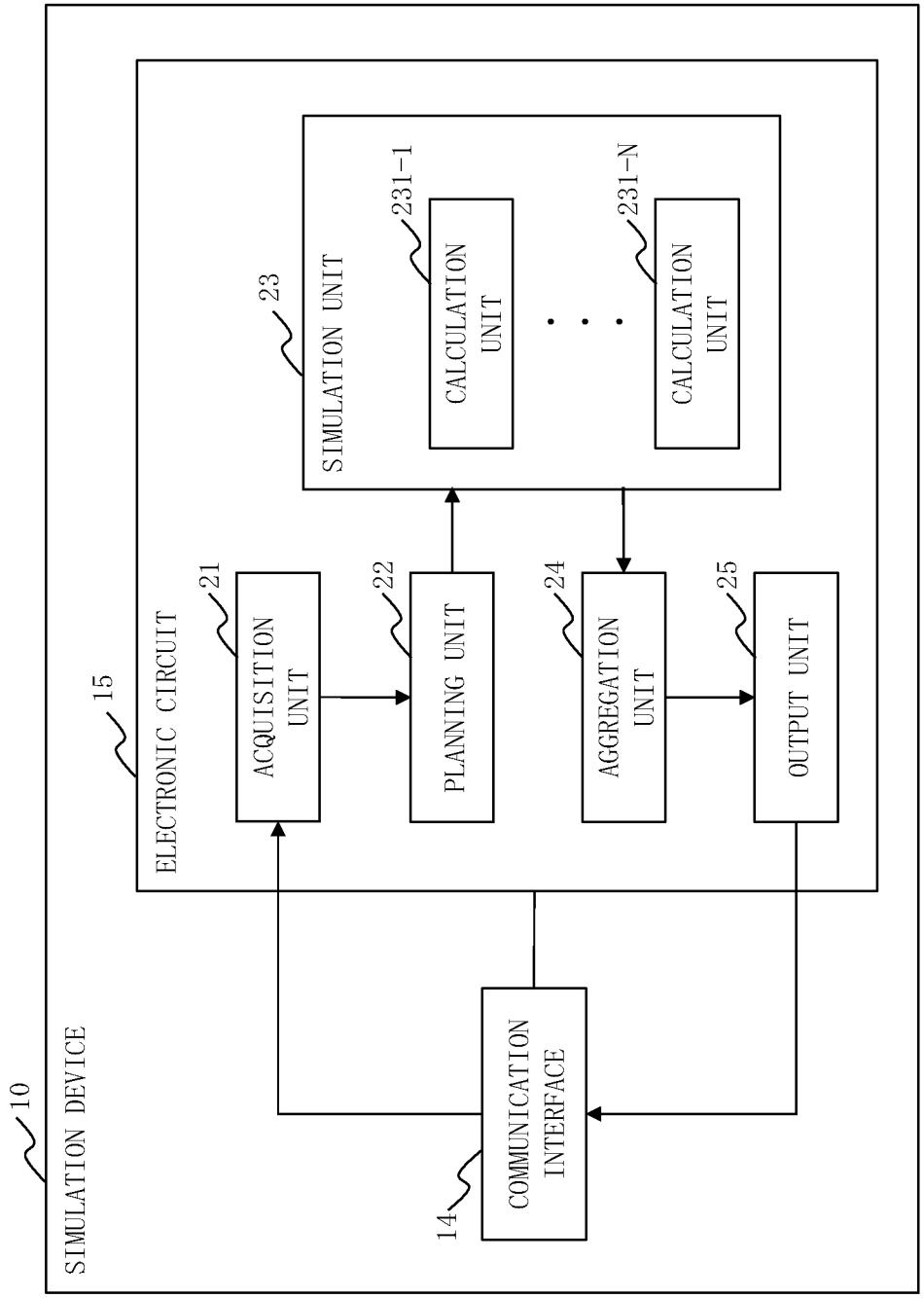
FIG. 9 is a configuration diagram of the simulation device 10 according to Modification 5.

With reference to FIG. 9, a configuration of the simulation device 10 according to Modification 5 will be described.

In case where the functional components are implemented by hardware, the simulation device 10 includes an electronic circuit 15 in place of the processor 11, the memory 12, and the storage 13. The electronic circuit 15 is a dedicated circuit that implements the functional components and functions of the memory 12 and the storage 13.

As the electronic circuit 15, a single circuit, a composite circuit, a programmed processor, a parallelly programmed processor, a logic IC, a GA (Gate Array), an ASIC (Application Specific Integrated Circuit), or an FPGA (Field-Programmable Gate Array) can be assumed.

The functional components may be implemented by one electronic circuit 15 or the functional components may be dispersively implemented by a plurality of electronic circuits 15.

<Modification 6>

In Modification 6, some of the functional components may be implemented by hardware and the other functional components may be implemented by software.

The processor 11, the memory 12, the storage 13, and the electronic circuit 15 are referred to as a processing circuit. That is, the functions of the functional components are implemented by the processing circuit.

Embodiment 2

Embodiment 2 differs from Embodiment 1 in that initial values of the quantities of state concerning the thermal environment are provided for each split period. As for Embodiment 2, these differences will be described and description of identical points is omitted.

*Description of Configuration*

Figure 10:
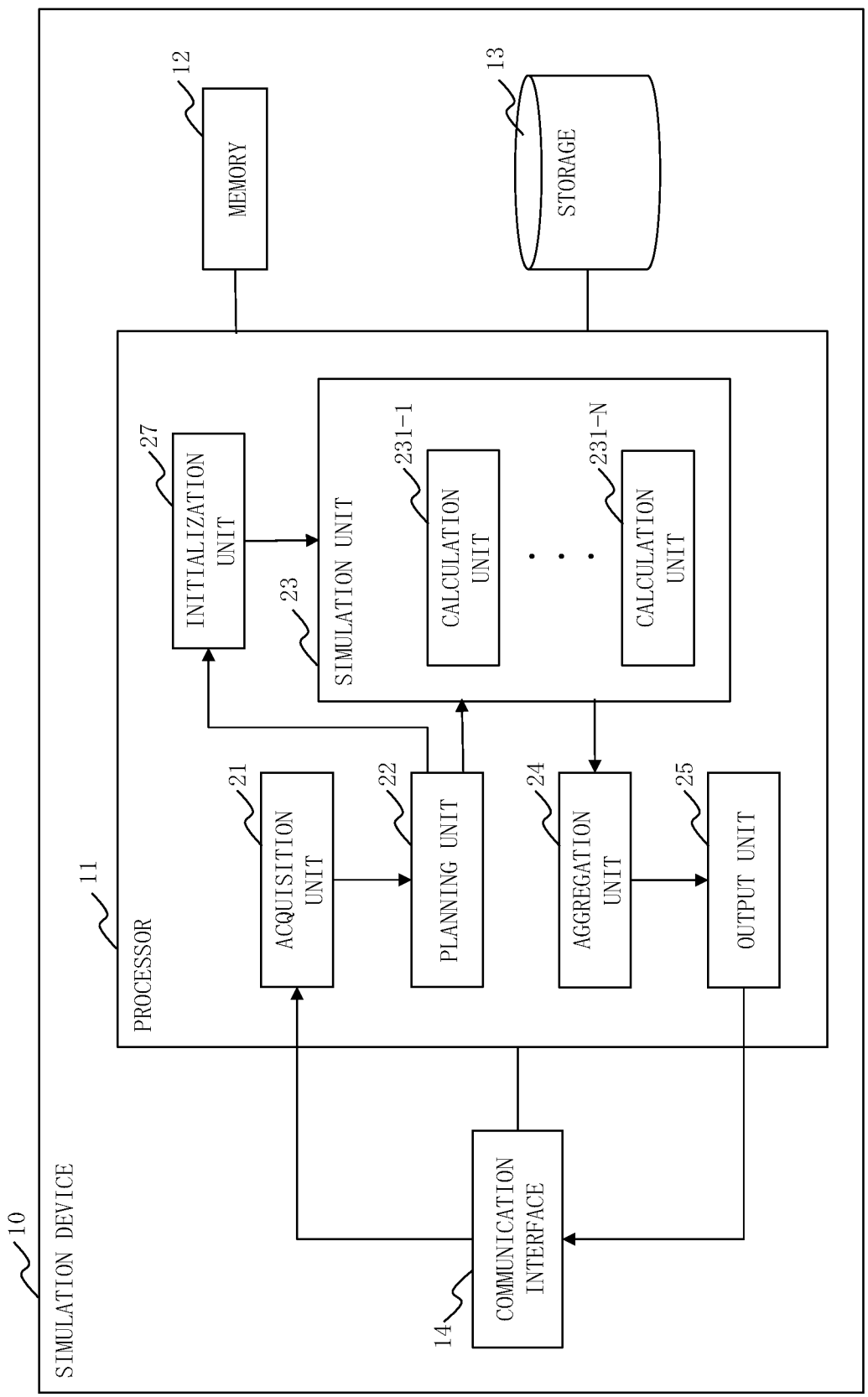
FIG. 10 is a configuration diagram of the simulation device 10 according to Embodiment 2.

With reference to FIG. 10, a configuration of the simulation device 10 according to Embodiment 2 will be described.

The simulation device 10 differs from the simulation device 10 illustrated in FIG. 1 in that an initialization unit 27 is included as a functional component.

*Description of Operation*

Figure 11:
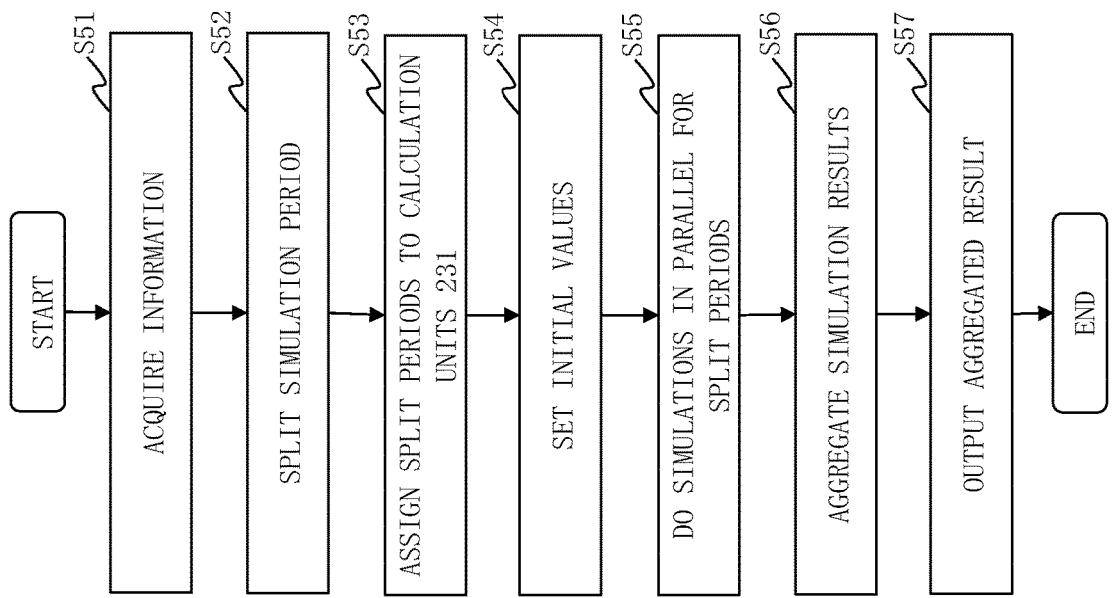
FIG. 11 is a flowchart of general processing by the simulation device 10 according to Embodiment 2.

With reference to FIG. 11, general processing by the simulation device 10 according to Embodiment 2 will be described.

Processes of step S51 to step S53 are the same as the processes of step S11 to step S13 in FIG. 2. In addition, processes of step S55 to step S57 are the same as the processes of step S14 to step S16 in FIG. 2. In step S55, however, the simulations are performed with use of the initial values set in a process of step S54 that will be described later.

(Step S54: Initialization Process)

The initialization unit 27 sets each split period, generated in step S52, as an object split period and sets quantities of state, concerning thermal environment in a building and corresponding to a starting day of the object split period, as the initial values for the object split period.

Figure 12:
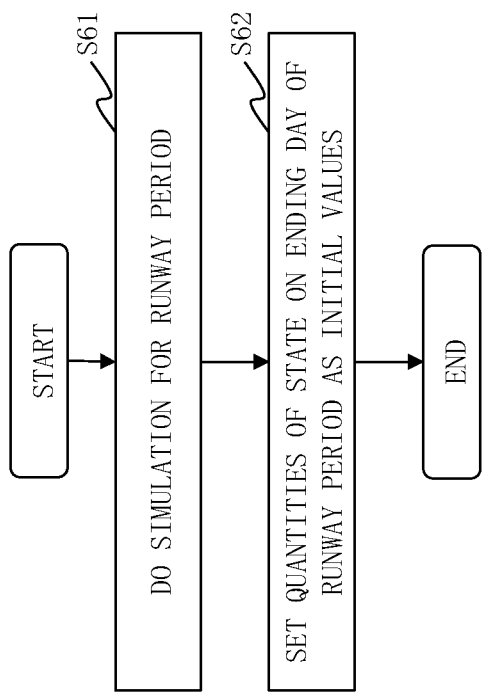
FIG. 12 is a flowchart of an initialization process according to Embodiment 2.

With reference to FIG. 12, an initialization process according to Embodiment 2 will be described.

The initialization unit 27 sets each split period as the object split period and executes processes of step S61 and step S62.

(Step S61: Runway Process)

The initialization unit 27 sets a period, preceding the object split period, as a runway period for the object split period. The initialization unit 27 does a simulation for the runway period. Thus the quantities of state concerning the thermal environment of an ending day of the runway period are calculated.

(Step S62: Initial Value Setting Process)

The initialization unit 27 writes the quantities of state, calculated in step S61 and concerning the thermal environment of the ending day of the runway period, as the initial values for the object split period into the storage 13.

*Effects of Embodiment 2*

In the simulation device 10 according to Embodiment 2, as described above, the runway period is set for each split period and the simulations are performed with use of the quantities of state, acquired in the runway period, as the initial values. Thus errors in the simulations can be decreased in comparison with Embodiment 1.

*Other Configurations*

<Modification 7>

In Embodiment 2, the initial values are calculated through performance of the simulation for the runway period. Time taken by the simulations, however, is prolonged all the more for the performance of the simulation for the runway period.

Therefore, the initialization unit 27 may calculate the initial values for each condition in advance by doing a simulation for each condition or the like before doing the simulations. A specific example of the condition is a condition such as whether it is cooling operation time, heating operation time, or time when neither cooling operation nor heating operation is performed. In this case, the initialization unit 27 calculates the quantities of state for the cooling operation time as the initial values for the cooling operation time. In addition, the initialization unit 27 calculates the quantities of state for the heating operation time as the initial values for the heating operation time. Further, the initialization unit 27 calculates the quantities of state for the time when neither cooling operation nor heating operation is performed, as the initial values for the time when neither cooling operation nor heating operation is performed. Then the initialization unit 27 writes these initial values into the storage 13.

In step S55, the calculation unit 231 of the simulation unit 23 identifies which one the day before the starting day of the split period satisfies among the cooling operation time, the heating operation time, and the time when neither cooling operation nor heating operation is performed. For instance, the calculation unit 231 is capable of identifying which one the day before the starting day of the split period satisfies, by preliminarily determining which one each day satisfies.

The embodiments and modifications of the present disclosure have been described above. Some of these embodiments and modifications of the present disclosure may be embodied in combination. Alternatively, any one or some thereof may be partially embodied. The present disclosure is not limited to the above embodiments and modifications and alterations thereto may be made as appropriate.

REFERENCE SIGNS LIST

10: simulation device; 11: processor; 12: memory; 13: storage; 14: communication interface; 15: electronic circuit; 21: acquisition unit; 22: planning unit; 23: simulation unit; 24: aggregation unit; 25: output unit; 26: condition determination unit; 27: initialization unit

The invention claimed is:

1. A simulation device for considering a change of thermal environment inside a building over nonoperating days, comprising:

processing circuitry to:

acquire a simulation period indicating an object period for which simulations of amounts of energy consumption in the building are to be done, a parallel number indicating the number of the simulations that are to be performed in parallel, and a holiday condition indicating nonoperating days of an air conditioning system installed in the building, set the number of days, resulting from division of the number of days of the simulation period by the parallel number with roundup of digits after decimal point, as a reference number of days, and split the acquired simulation period into the parallel number so as to generate split periods so that numbers of days of the split periods approximate the reference number of days and so that starting days of the split periods other than an initial split period in the simulation period are the nonoperating days indicated by the holiday condition to reduce influence of initialization errors due to splitting asymptotically, and do the simulations of the amounts of energy consumption in the building in parallel, for the split periods generated by splitting to minimize errors in the simulations.

2. A simulation device for considering a change of thermal environment inside a building over nonoperating days, comprising:

processing circuitry to:

acquire a simulation period indicating an object period for which simulations of amounts of energy consumption in the building are to be done, a parallel number indicating the number of the simulations that are to be performed in parallel, and a holiday condition indicating nonoperating days of an air conditioning system installed in the building, split the acquired simulation period into the parallel number so as to generate split periods so that starting days of the split periods other than an initial split period in the simulation period are the nonoperating days indicated by the holiday condition to reduce influence of initialization errors due to splitting asymptotically, and do the simulations of the amounts of energy consumption in the building in parallel, for the split periods generated by splitting to minimize errors in the simulations, wherein the processing circuitry sets the number of days, resulting from the division of the number of days of the simulation period by the parallel number with the roundup of digits after decimal point, as a reference number of days, sets a day before a first nonoperating day on or after a day that is the reference number of days after a starting day of the simulation period, as an ending day of a first split period, and sets the first nonoperating day as a starting day of a second split period, and sets a day before an i-th nonoperating day that is a first nonoperating day on or after a day which is the reference number of days after a starting day of an i-th split period, as an ending day of the i-th split period, and sets the i-th nonoperating day as a starting day of an i+1-th split period, sequentially from i=2 to n−1, where n is the parallel number.

3. The simulation device according to claim 2, wherein the processing circuitry sets the starting day of the simulation period or a first nonoperating day preceding the simulation period, as a starting day of a first split period.

4. The simulation device according to claim 2, wherein in case where the split periods are each set as an object split period and where a starting day of the object split period is within consecutive holidays in which nonoperating days continue, the processing circuitry sets the starting day of the object split period on a first day of the consecutive holidays and sets an ending day of the split period before the object split period on a day before the first day of the consecutive holidays.

5. A simulation device for considering a change of thermal environment inside a building over nonoperating days, comprising:
processing circuitry to:
acquire a simulation period indicating an object period for which simulations of amounts of energy consumption in the building are to be done, a parallel number indicating the number of the simulations that are to be performed in parallel, and a holiday condition indicating nonoperating days of an air conditioning system installed in the building,
split the acquired simulation period into the parallel number so as to generate split periods so that starting days of the split periods other than an initial split period in the simulation period are the nonoperating days indicated by the holiday condition to reduce influence of initialization errors due to splitting asymptotically, and
do the simulations of the amounts of energy consumption in the building in parallel, for the split periods generated by splitting to minimize errors in the simulations, wherein
the processing circuitry sets the number of days, resulting from the division of the number of days of the simulation period by the parallel number with the roundup of digits after decimal point, as a reference number of days, sets a day before an i-th nonoperating day that is a first nonoperating day on or after a day which is the reference number of days multiplied by i after a starting day of the simulation period, as an ending day of an i-th split period, and sets the i-th nonoperating day as a starting day of an i+1-th split period, sequentially from i=1 to n−1, where n is the parallel number.

6. The simulation device according to claim 5, wherein the processing circuitry sets the starting day of the simulation period or a first nonoperating day preceding the simulation period, as a starting day of a first split period.

7. The simulation device according to claim 5, wherein in case where the split periods are each set as an object split period and where a starting day of the object split period is within consecutive holidays in which nonoperating days continue, the processing circuitry sets the starting day of the object split period on a first day of the consecutive holidays and sets an ending day of the split period before the object split period on a day before the first day of the consecutive holidays.

8. A simulation device for considering a change of thermal environment inside a building over nonoperating days, comprising:
processing circuitry to:
acquire a simulation period indicating an object period for which simulations of amounts of energy consumption in the building are to be done, a parallel number indicating the number of the simulations that are to be performed in parallel, and a holiday condition indicating nonoperating days of an air conditioning system installed in the building,
determine whether an amount of heat exchange between room interior of the building and outdoors on a nonoperating day indicated by the acquired holiday condition exceeds a reference value or not,
split the acquired simulation period, in case where it has determined that the amount of the heat exchange exceeds the reference value, the simulation period being split into the parallel number so as to generate split periods so that starting days of the split periods other than an initial split period in the simulation period are the nonoperating days indicated by the holiday condition to reduce influence of initialization errors due to splitting asymptotically, and
do the simulations of the amounts of energy consumption in the building in parallel, for the split periods generated by splitting to minimize errors in the simulations.

9. A simulation device for considering a change of thermal environment inside a building over nonoperating days, comprising:
processing circuitry to
acquire a simulation period indicating an object period for which simulations of amounts of energy consumption in the building are to be done, a parallel number indicating the number of the simulations that are to be performed in parallel, and a holiday condition indicating nonoperating days of an air conditioning system installed in the building,
split the acquired simulation period into the parallel number so as to generate split periods so that starting days of the split periods other than an initial split period in the simulation period are the nonoperating days indicated by the holiday condition to reduce influence of initialization errors due to splitting asymptotically, and
do the simulations of the amounts of energy consumption in the building in parallel, for the split periods generated by splitting to minimize errors in the simulations, wherein
the processing circuitry sets each of the split periods as an object split period, and does the simulation for the object split period by using a quantity of state, concerning the thermal environment in the building, for a day before the starting day of the object split period, obtained by performance of the simulation of the amount of energy consumption in the building for a runway period from a prescribed number of days before the starting day of the object split period to the day before the starting day of the object split period, as an initial value.

10. A simulation method for considering a change of thermal environment inside a building over nonoperating days, comprising:
acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;

setting the number of days, resulting from division of the number of days of the simulation period by the parallel number with roundup of digits after decimal point, as a reference number of days, and splitting the simulation period into the parallel number so as to generate split periods so that numbers of days of the split periods approximate the reference number of days and so that starting days of the split periods other than an initial split period in the simulation period are the nonoperating days indicated by the holiday condition to reduce influence of initialization errors due to splitting asymptotically; and doing the simulations of the amounts of energy consumption in the building in parallel, for the split periods to minimize errors in the simulations.

11. A simulation method for considering a change of thermal environment inside a building over nonoperating days, comprising:

acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;

splitting the simulation period into the parallel number so as to generate split periods so that starting days of the split periods other than an initial split period in the simulation period are the nonoperating days indicated by the holiday condition to reduce influence of initialization errors due to splitting asymptotically; and doing the simulations of the amounts of energy consumption in the building in parallel, for the split periods to minimize errors in the simulations, wherein the number of days, resulting from the division of the number of days of the simulation period by the parallel number with the roundup of digits after decimal point, is set as a reference number of days, a day before a first nonoperating day on or after a day that is the reference number of days after a starting day of the simulation period is set as an ending day of a first split period, and the first nonoperating day is set as a starting day of a second split period, and a day before an i-th nonoperating day that is a first nonoperating day on or after a day which is the reference number of days after a starting day of an i-th split period is set as an ending day of the i-th split period, and the i-th nonoperating day is set as a starting day of an i+1-th split period, sequentially from i=2 to n−1, where n is the parallel number.

12. A simulation method for considering a change of thermal environment inside a building over nonoperating days, comprising:

acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;

splitting the simulation period into the parallel number so as to generate split periods so that starting days of the split periods other than an initial split period in the simulation period are the nonoperating days indicated by the holiday condition to reduce influence of initialization errors due to splitting asymptotically; and doing the simulations of the amounts of energy consumption in the building in parallel, for the split periods to minimize error in the simulations, wherein the number of days, resulting from the division of the number of days of the simulation period by the parallel number with the roundup of digits after decimal point, is set as a reference number of days, a day before an i-th nonoperating day that is a first nonoperating day on or after a day which is the reference number of days multiplied by i after a starting day of the simulation period is set as an ending day of an i-th split period, and the i-th nonoperating day is set as a starting day of an i+1-th split period, sequentially from i=1 to n−1, where n is the parallel number.

13. A simulation method for considering change of thermal environment inside a building over nonoperating days, comprising:

acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;

determining whether an amount of heat exchange between room interior of the building and outdoors on a nonoperating day indicated by the holiday condition exceeds a reference value or not;

splitting the simulation period, in case where it has been has determined that the amount of the heat exchange exceeds the reference value, the simulation period being split into the parallel number so as to generate split periods so that starting days of the split periods other than an initial split period in the simulation period are the nonoperating days indicated by the holiday condition to reduce influence of initialization errors due to splitting asymptotically; and doing the simulations of the amounts of energy consumption in the building in parallel, for the split periods to minimize errors in the simulations.

14. A simulation method for considering a change of thermal environment inside a building over nonoperating days, comprising:

acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;

splitting the simulation period into the parallel number so as to generate split periods so that starting days of the split periods other than an initial split period in the simulation period are the nonoperating days indicated by the holiday condition to reduce influence of initialization errors due to splitting asymptotically; and doing the simulations of the amounts of energy consumption in the building in parallel, for the split periods to minimize errors in the simulations, wherein each of the split periods is set as an object split period, and the simulation for the object split period is done by using a quantity of state, concerning the thermal environment in the building, for a day before the starting day of the object split period, obtained by performance of the simulation of the amount of energy consumption in the building for a runway period from a prescribed number of days before the starting day of the object split period to the day before the starting day of the object split period, as an initial value.

15. A non-transitory computer readable medium storing a simulation program that causes a computer to function as a simulation device for considering a change of thermal environment inside a building over nonoperating days to execute:
an acquisition process of acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;
a planning process of setting the number of days, resulting from division of the number of days of the simulation period by the parallel number with roundup of digits after decimal point, as a reference number of days, and splitting the simulation period, acquired by the acquisition process, into the parallel number so as to generate split periods so that numbers of days of the split periods approximate the reference number of days and so that starting days of the split periods other than an initial split period in the simulation period are the nonoperating days indicated by the holiday condition to reduce influence of initialization errors due to splitting asymptotically; and
a simulation process of doing the simulations of the amounts of energy consumption in the building in parallel, for the split periods generated by splitting in the planning process to minimize errors in the simulations.

16. A non-transitory computer readable medium storing a simulation program that causes a computer to function as a simulation device for considering a change of thermal environment inside a building over nonoperating days to execute:
an acquisition process of acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;
a planning process of splitting the simulation period, acquired by the acquisition process, into the parallel number so as to generate split periods so that starting days of the split periods other than an initial split period in the simulation period are the nonoperating days indicated by the holiday condition to reduce influence of initialization errors due to splitting asymptotically; and
a simulation process of doing the simulations of the amounts of energy consumption in the building in parallel, for the split periods generated by splitting by the planning process to minimize errors in the simulations, wherein
in the planning process
the number of days, resulting from the division of the number of days of the simulation period by the parallel number with the roundup of digits after decimal point, is set as a reference number of days, a day before a first nonoperating day on or after a day that is the reference number of days after a starting day of the simulation period is set as an ending day of a first split period, and the first nonoperating day is set as a starting day of a second split period, and a day before an i-th nonoperating day that is a first nonoperating day on or after a day which is the reference number of days after a starting day of an i-th split period is set as an ending day of the i-th split period, and the i-th nonoperating day is set as a starting day of an i+1-th split period, sequentially from i=2 to n−1, where n is the parallel number.

17. A non-transitory computer readable medium storing a simulation program that causes a computer to function as a simulation device for considering a change of thermal environment inside a building over nonoperating days to execute:
an acquisition process of acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;
a planning process of splitting the simulation period, acquired by the acquisition process, into the parallel number so as to generate split periods so that starting days of the split periods other than an initial split period in the simulation period are the nonoperating days indicated by the holiday condition to reduce influence of initialization errors due to splitting asymptotically; and
a simulation process of doing the simulations of the amounts of energy consumption in the building in parallel, for the split periods generated by splitting by the planning process to minimize errors in the simulations, wherein
in the planning process, the number of days, resulting from the division of the number of days of the simulation period by the parallel number with the roundup of digits after decimal point, is set as a reference number of days, a day before an i-th nonoperating day that is a first nonoperating day on or after a day which is the reference number of days multiplied by i after a starting day of the simulation period is set as an ending day of an i-th split period, and the i-th nonoperating day is set as a starting day of an i+1-th split period, sequentially from i=1 to n−1, where n is the parallel number.

18. A non-transitory computer readable medium storing a simulation program that causes a computer to function as a simulation device for considering a change of thermal environment inside a building over nonoperating days to execute:
an acquisition process of acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;
a condition determination process of determining whether an amount of heat exchange between room interior of the building and outdoors on a nonoperating day indicated by the holiday condition, acquired by the acquisition process, exceeds a reference value or not;
a planning process of, in case where the condition determination process has determined that the amount of the heat exchange exceeds the reference value, splitting the simulation period, acquired by the acquisition process, into the parallel number so as to generate split periods so that starting days of the split periods other than an initial split period in the simulation period are the nonoperating days indicated by the holiday condition to reduce influence of initialization errors due to splitting asymptotically; and a simulation process of doing the simulations of the amounts of energy consumption in the building in parallel, for the split periods generated by splitting by the planning process to minimize errors in the simulations.

19. A non-transitory computer readable medium storing a simulation program that causes a computer to function as a simulation device for considering a change of thermal environment inside a building over nonoperating days to execute:

an acquisition process of acquiring a simulation period indicating an object period for which simulations of amounts of energy consumption in the building are to be done, a parallel number indicating the number of the simulations that are to be performed in parallel, and a holiday condition indicating nonoperating days of an air conditioning system installed in the building;

a planning process of splitting the simulation period, acquired by the acquisition process, into the parallel number so as to generate split periods so that starting days of the split periods other than an initial split period in the simulation period are the nonoperating days indicated by the holiday condition to reduce influence of initialization errors due to splitting asymptotically; and a simulation process of doing the simulations of the amounts of energy consumption in the building in parallel, for the split periods generated by splitting by the planning process to minimize errors in the simulations, wherein in the simulation process, each of the split periods is set as an object split period, and the simulation for the object split period is done by using a quantity of state, concerning the thermal environment in the building, for a day before the starting day of the object split period, obtained by performance of the simulation of the amount of energy consumption in the building for a runway period from a prescribed number of days before the starting day of the object split period to the day before the starting day of the object split period, as an initial value.

* * * * *